Figure 1:
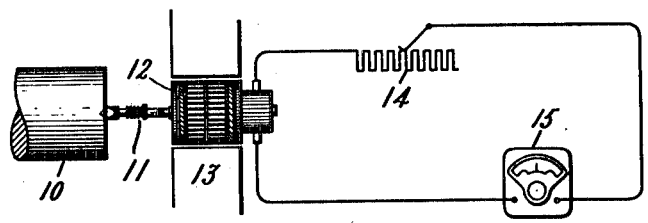

R. B. OWENS.
ACCELERATION INDICATOR.
APPLICATION FILED APR. 2, 1906.

1,096,942.

Patented May 19, 1914.

Witnesses:
George H. Tilden.

Inventor:
Robert B. Owens;
by Albert G. Davis
Att'y.

UNITED STATES PATENT OFFICE.

ROBERT B. OWENS, OF MONTREAL, QUEBEC, CANADA, ASSIGNOR TO GENERAL ELECTRIC COMPANY, A CORPORATION OF NEW YORK.

ACCELERATION-INDICATOR.

1,096,942. Specification of Letters Patent. Patented May 19, 1914.

Application filed April 2, 1906. Serial No. 309,341.

*To all whom it may concern:*

Be it known that I, ROBERT B. OWENS, a citizen of the United States, residing at Montreal, Province of Quebec, Canada, have invented certain new and useful Improvements in Acceleration-Indicators, of which the following is a specification.

This invention relates to the measurement of the velocity or speed of moving bodies, and has for its object the provision of a method and means whereby the speed of rotating bodies or changes thereof may be indicated in a simple, reliable and efficient manner.

More specifically, my invention relates to the measurement of acceleration or rate of change of speed.

The advent of the electric motor as a competitor of the steam engine, especially in the traction field, has given rise to certain acceleration problems unfamiliar a generation ago. In certain cases at the present time more energy is expended in accelerating the train than in overcoming frictional and grade resistances. For this and other reasons there is a demand for a simple, accurate and reliable means of measuring acceleration; such a means as will be comparable in simplicity and accuracy to those employed in the measuring of the quantities of which acceleration is the second and first differential coefficient with respect to time.

The object of my invention, therefore, is to provide a simple and accurate method of measuring acceleration, in addition to means for carrying the said method into effect.

My method consists broadly in measuring a quantity which is a derivative or differential coefficient with respect to time of a second quantity by generating an action proportional to the second quantity and measuring the differential coefficient of the action with respect to time.

More particularly my method consists in measuring a quantity which is a derivative, or differential coefficient, with respect to time of a second quantity by generating an electromotive force, or current, proportional to the second quantity and employing this electromotive force to produce an action which is the derivative of the electromotive force with respect to time, and then measuring, or indicating by suitable instrumentalities, such action.

Still more specifically my method consists in generating an electric current proportional to the time rate of change of speed of the body, the acceleration of which is to be measured, and then measuring the current.

I have discovered that a very practical and satisfactory arrangement for carrying out my method is found in the use of a suitable continuous current dynamo mechanically or otherwise driven by the piece whose velocity is to be measured, and that a current indicator connected in the circuit of said dynamo may, by means of adjusting resistance, be calibrated to indicate speed. The current generated by the dynamo being proportional to the speed it is only necessary to determine the rate at which the current varies in order to have a measure of the acceleration. In carrying out my invention I have accomplished this by inserting the primary of a transformer in the dynamo circuit, the secondary of which is in circuit with a current indicator and calibrating resistance so that only changes of speed will be noted by the instrument.

Figure 2:
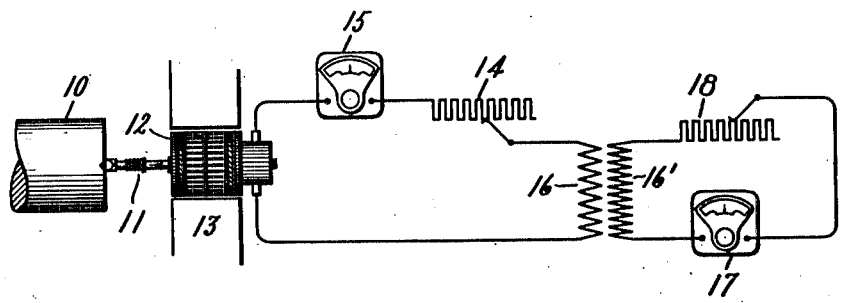

In the accompanying drawings in which I have shown one embodiment of my invention, Figure 1 represents diagrammatically my arrangement in which a speed indicator alone is used; and Fig. 2 shows diagrammatically my arrangement when the acceleration device is used in connection with the speed indicator.

Referring to the drawings, 10 is a shaft or rotating body whose velocity is to be measured. 11 is a mechanical coupler for driving the armature 12 from the shaft 10. This driving may be accomplished in any desired manner depending upon the size, speed and other conditions of the machine to be tested. The armature 12 may be of any approved design, but should be wound so as to have a negligible reaction in the limits of its use, and is used preferably in connection with the permanent magnetic field 13 for generating the current. A variable non-inductive resistance 14 and a zero-center direct-current ammeter 15 are connected in the dynamo circuit as shown. The reading of the ammeter will then be a measure of the speed of the shaft 10 and by adjusting the resistance the ammeter may be calibrated so as to indicate revolutions per minute or miles per hour, as desired.

As the current through the ammeter is proportional to the speed it is only necessary as before stated to determine the rate at which the current varies in order to have a measure of acceleration. This I have done in a very simple manner by inserting in circuit with the ammeter 15 the primary 16 of a transformer; the secondary 16ᶜ of which transformer has in circuit therewith a zero-center direct-current voltmeter 17 and a non-inductive variable resistance 18. By adjusting the resistance 18 the reading of the voltmeter may be given a desired range with respect to the acceleration, positive or negative of the shaft 10. The transformer should have a straight line saturation curve and a large transformation ratio as the secondary induced voltage is necessarily small. The voltmeter should likewise be sensitive. The calibration of the ammeter as a speed indicator may be effected by driving the armature 12 at different constant speeds as shown by ammeter readings and taking the revolutions in a given time in some manner, as by means of a revolution counter and stop watch. The calibration of the voltmeter as an accelerometer is best done by driving the armature 12 by a separately and constantly excited motor having applied to its armature, preferably of small moment of inertia, a steadily increasing or decreasing voltage, which may be secured by connecting a resistance strip across a supply circuit in which the voltage is the maximum to be impressed upon the motor armature, and completing a circuit from one side of said supply circuit through the armature to a sliding contact which engages the resistance strip and is moved along it from one terminal to the other at a uniform rate by any suitable means. Since the voltage on the resistance strip decreases uniformly from one end to the other, and the contact finger moves over it at a uniform rate, the voltage applied to the motor armature increases or decreases at a uniform rate, and consequently the generator 12 driven by the motor delivers a current which increases or decreases uniformly. The ammeter readings of the current when plotted against time will be a straight line whose slope is a measure of the acceleration. The uniform change in current causes a uniform change in flux in the transformer and gives on the voltmeter a constant reading which measures the acceleration. By moving the contact finger over the resistance at different uniform speeds various points are obtained on the voltmeter scale which correspond to various rates of acceleration.

Standard instruments may be used in the arrangements above described, for instance, 15 may be a Weston ammeter and 17 a Weston millivoltmeter, while the transformer may be a standard lighting transformer with a transformation ratio of about 20. By these arrangements the speed and acceleration may be read to whatever degree of accuracy the ammeter and voltmeter are capable of.

It will be of course understood that the arrangements which I have herein shown and described for carrying out my invention are merely typical, and that I do not mean to limit my invention to the specific arrangement of parts or combination of elements herein disclosed except so far as it is limited by the claims annexed to and forming a part of this specification.

What I claim as new and desire to secure by Letters Patent of the United States, is,—

1. An acceleration indicator comprising a closed circuit, an electric generator arranged to deliver energy to said circuit in proportion to its speed, and means in operative relation with said circuit and responsive only to the time rate of change in the amount of energy delivered by said generator for indicating the rate of said change.

2. An acceleration indicator comprising a closed circuit, a generator arranged to supply said closed circuit with current proportional in amount to the speed of the generator, and means in inductive relation to said circuit and responsive only to the time rate of change in the amount of current in the said circuit for indicating the rate of change of the current in said circuit.

3. An acceleration indicator comprising a closed circuit, a continuous current generator arranged to supply said closed circuit with current proportional in amount to the speed of the generator, and a device in operative relation with said circuit and responsive only to the time rate of change in the amount of said current for indicating the rate of said change.

4. The combination with a rotating shaft, of a continuous current generator adapted to be driven thereby, means for inducing a current from the generator current and means responsive to the induced current for indicating the rate of change of speed of said shaft.

5. An acceleration indicator comprising a constantly excited continuous current generator, means for inducing a current from the generator current and means responsive to said induced current for indicating the rate of change of speed of said generator.

6. The combination with a rotatable shaft of a continuous current generator adapted to be driven by said shaft, a closed circuit adapted to be supplied with current from said generator, and means in operative relation with said circuit and responsive only to the time rate of change of the current of said generator for indicating the rate of speed variation of said shaft.

7. An accelerometer comprising a continuous current generator and means whereby it may be driven from a rotating shaft, a transformer having its primary winding in the circuit of the generator, and an electric meter connected to the secondary winding of said transformer calibrated to indicate the rate of change of speed of said shaft.

8. The combination with a rotating shaft, of a continuous current generator driven thereby, a circuit supplied by said generator, means in said circuit for producing a derived current proportional to the rate of change of current from the generator, a circuit wherein said derived current is produced, a device in said first circuit for indicating the speed of said shaft, and a device in said second circuit for indicating the rate of change of speed of said shaft.

9. An accelerometer comprising a continuous current generator and means whereby it may be driven from a rotating shaft, a transformer having its primary winding in the circuit of the generator, and a voltmeter and calibrating resistance therefor connected to the secondary winding of said transformer for indicating the rate of change of speed of the shaft.

10. An accelerometer comprising a continuous current generator and means whereby it may be driven from a rotating shaft, a transformer having its primary winding in the circuit of the generator, an ammeter and calibrating resistance therefor in said circuit for indicating the speed of the shaft, and a voltmeter and calibrating resistance therefor connected to the secondary winding of said transformer for indicating the rate of change of speed of the shaft.

11. A method of measuring the acceleration of a moving body, which consists in generating a primary current by the movement of said body, producing by said primary current a secondary current proportional to the time rate of change of speed of said body, and then measuring said secondary current.

12. A method of measuring the acceleration of a moving body, which consists in producing from a primary current generated by the movement of said body an induced current proportional to the time rate of change of speed of said body, and then measuring said induced current.

In witness whereof, I have hereunto set my hand this 28th day of March, 1906.

ROBT. B. OWENS.

Witnesses:
C. H. McLeod,
J. G. G. Kerry.